United States Patent
Khayrallah

(10) Patent No.: US 8,407,573 B2
(45) Date of Patent: Mar. 26, 2013

(54) METHOD AND APPARATUS FOR EQUALIZATION OF RECEIVED SIGNALS

(75) Inventor: Ali Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 825 days.

(21) Appl. No.: 12/576,343

(22) Filed: Oct. 9, 2009

(65) Prior Publication Data

US 2011/0085623 A1   Apr. 14, 2011

(51) Int. Cl.
*G06F 11/00* (2006.01)
(52) U.S. Cl. .................... 714/799; 714/794; 714/796
(58) Field of Classification Search .............. 714/799, 714/794, 796, 795, 702, 704, 709, 810
See application file for complete search history.

(56) References Cited

U.S. PATENT DOCUMENTS

| | | | | |
|---|---|---|---|---|
| 5,303,263 A * | 4/1994 | Shoji et al. | ............... | 375/229 |
| 6,512,802 B1 | 1/2003 | Olivier et al. | | |
| 7,080,295 B2 * | 7/2006 | Peeters et al. | ............... | 714/709 |
| 7,155,660 B1 * | 12/2006 | Burd | ............... | 714/795 |
| 7,765,441 B2 * | 7/2010 | Peeters et al. | ............... | 714/702 |
| 7,917,836 B1 * | 3/2011 | Burd | ............... | 714/795 |

* cited by examiner

*Primary Examiner* — Fritz Alphonse

(57) ABSTRACT

A receiver for a mobile communication device comprises an primary detector for generating an initial sequence estimate comprising a plurality of initial symbol estimates from a received symbol sequence corrupted by intersymbol interference, and a secondary detector to receive said initial sequence estimate and to output a final sequence estimate comprising a plurality of final symbol estimates. The secondary detector comprises a sequence generator configured to generate one or more revised sequence estimates by replacing at least one initial symbol estimate in said initial sequence estimate with a corresponding nearest neighbor symbol in each of said revised symbol estimates; an error calculator to compute error metrics for said revised sequence estimates; and a selection circuit to compare error metrics for said initial and revised sequence estimates and to output one of said initial or revised sequence estimates as said final sequence estimate based on said error metrics.

18 Claims, 5 Drawing Sheets

4 ASK CONSTELLATION WITH GRAY MAP

8 ASK CONSTELLATION WITH GRAY MAP

METHOD AND APPARATUS FOR EQUALIZATION OF RECEIVED SIGNALS

BACKGROUND

The present invention relates generally to equalization of received signals and more particularly, to reduced complexity approaches to signal equalization to mitigate the effects of intersymbol interference.

There are three main categories of equalizers. Linear equalizers can be thought of as linear filters, which try to collect the energy of the signal that has been spread over the channel response. Linear equalizers may also try to suppress residual interference due to intersymbol interference (ISI), or interference from other signals, by treating the interference as colored noise. Examples of linear receivers include the RAKE and GRAKE receivers and the chip equalizer.

A second category comprises non-linear equalizers that operate over a trellis. The trellis is defined by the state space derived from the channel model. Paths through the trellis represent candidate symbol sequences. These equalizers conduct a breadth first search through the trellis. Examples of non-linear include maximum likelihood sequence estimation (MLSE), truncated MLSE (TMLSE), and decision feedback sequence estimation (DFSE).

A third category is non-linear equalizers that operate over a tree. The tree is also defined by the channel state space. Paths on the tree represent symbol sequences. These equalizers conduct a depth first search, focusing on the most promising symbol sequences first. Examples include the stack algorithm (SA), the M algorithm, and the bucket algorithm.

The use of large signal constellations such as 16, 32 and 64QAM in EDGE, HSPA, LTE and WiMax systems makes equalization more difficult. ISI causes the equalization complexity to grow exponentially with the size of the signal constellation. Thus, there is an interest in designing equalizers with low complexity and good performance for higher order modulation.

SUMMARY

The present invention relates to equalizing of a received signal that is subject to intersymbol interference (ISI). A detection circuit comprises a primary detector and a secondary detector. The primary detector implements a suboptimal detection algorithm to generate an initial sequence estimate based on the received signal. The primary detector or the secondary detector computes an error metric for the initial sequence estimate. The secondary detector then generates revised sequence estimates by substituting nearest neighbor symbols for initial symbol estimates in the initial sequence estimate, computes error metrics for the revised sequence estimates, and replaces the initial sequence estimate with a revised sequence estimate if one of the revised sequence estimate produces a lower error metric. In some embodiments of the invention, the secondary detector may also compute bit soft values for bits in the final symbol estimates.

DETAILED DESCRIPTION

Figure 1:
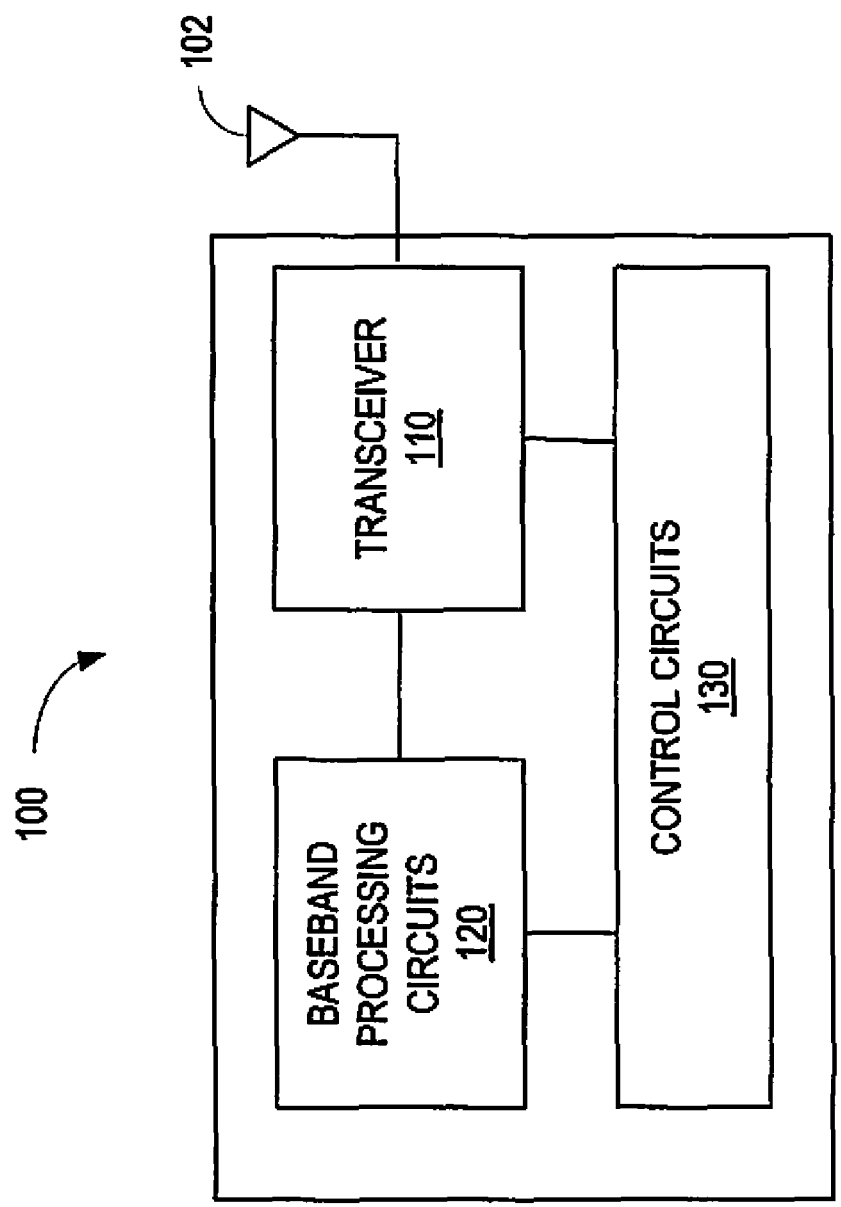
FIG. 1 illustrates an exemplary communication system.

Referring now to the drawings, FIG. 1 illustrates an exemplary wireless communication terminal indicated generally by the numeral 100, which may comprise, for example, a user terminal or a base station in a mobile communication network. The wireless communication terminal 100 may operate according to any communication standard now known or later developed. Exemplary communication standards include Wideband Code Division Multiple Access (WCDMA), Long Term Evolution (LTE), and WIMAX.

Wireless communication terminal 100 comprises a transceiver 110 coupled to an antenna 102 for transmitting and receiving signals, and a baseband processing circuit 120 for processing signals transmitted and received by the wireless communication terminal 100. Although only one antenna 102 is shown, those skilled in the art will appreciate that the wireless communication terminal 100 may have multiple antennas 102 for both transmission and reception.

The transceiver 110 includes a receiver and a transmitter. The receiver filters, amplifies, and downconverts received signals to baseband frequency. The baseband signals are converted into digital signals for input to the baseband processor 120. The transmitter converts transmit signals output by the baseband processor 120 into analog signals, which are then upconverted, filtered, and amplified for transmission via antenna 102.

The baseband processor 120 processes the signals transmitted and received by the wireless communication terminal 100. Typical processing tasks include, for example, equalization, modulation/demodulation, channel coding/decoding, etc. Program instructions and data to control the operation of the baseband processor 120 as hereinafter described may be stored in a computer readable memory, such as a random access memory (RAM), read-only member (ROM), flash memory, or other memory device. Control circuits 130 control the operation of the transceiver 110 and baseband processor 130. Control circuits 130 may be implemented in one or more processors. Baseband processor 120 and control circuit 130 may comprise one or more processors, microcontrollers, hardware circuits, or a combination thereof. Further, those skilled in the art will appreciate that the control circuit 130 and baseband processing circuit 120 may be implemented in a single processor.

The baseband processing circuit 120 includes a detection circuit 122 (FIG. 2) for detecting and equalizing a received signal r to mitigate the effect of intersymbol interference (ISI). The optimal detector would be a maximum likelihood (ML) detector. However, the complexity of a ML detector increases exponentially with the memory of the channel and the size of the symbol constellation. Therefore, implementation of ML detection algorithms may not be practical for higher order modulation schemes used in high data rate systems. In such circumstances, a detection algorithm that approximates an ML equalizer may be used. The complexity of the detector can be reduced by either reducing the search space or changing the decision metric, or both.

The detection circuit 122 according to the present invention recovers some of the performance loss of the reduced complexity equalization. The detection circuit 122 comprises a primary detector 124 for generating an initial sequence estimate using a reduced complexity algorithm, and a secondary detector 126 to search for a better sequence estimate in the vicinity of the initial sequence estimate generated by the primary detector 124. In one embodiment, the secondary detector 124 uses the true ML metric and performs a search of nearest neighbor symbols as hereinafter described. The secondary detector 124 may also generate bit soft values for use in subsequent decoding operations.

A brief description of the channel model is given to facilitate description of the present invention. For a symbol-spaced channel with memory M, the system model is given by:

$$r_k = H_M s_{k-M} + \ldots + H_1 s_{k-1} + H_0 s_k + v_k \quad (1)$$

where $r_k$ is the received symbol at symbol period k, $H_M$ is a channel estimate vector for a channel with memory M from the transmit antenna to receive antenna j, $s_k$ is the transmitted symbol at symbol period k, and $v_k$ is the white Gaussian noise. For simplicity, it is assumed that there is a single transmit antenna, and one or more receive antennas. The extension to multiple transmit antennas is straightforward. The channel estimates are assumed to be constant over the duration of a burst of data, which will be equalized in one shot. The signal $s_k$ has symbol constellation Q of size q.

For simplicity, it is assumed that the transmitter uses uncoded modulation. The transmitter may use partial response signaling, which is in effect filtering at the transmitter. In general, the effect of filtering at the transmitter or the receiver may be incorporated into the channel model above. If coded modulation such as trellis coded modulation or block coded modulation is used, the number of possible candidate sequences is reduced and will be reflected in the structure of the search trellis or the search tree. Otherwise, the same principles apply.

If K symbols are transmitted by the transmitter, the receiver must choose among $q^K$ possible candidate sequences of length K, denoted $\hat{S}_1 = (\hat{s}_1 \ldots \hat{s}_K)$, where the index i denotes a particular candidate sequence. An ML detector associates a sequence metric with each candidate sequence $\hat{S}_1$, and selects the candidate sequence with the "best" sequence metric. In the ML case, the detector computes incremental metrics for each symbol estimate in a candidate sequence and sums the incremental metrics to get a sequence metric. The incremental metric for a symbol in the candidate sequence is the minimum mean squared error given by $$e_k = \|r_k - \hat{r}_k\|^2 \quad (2)$$

where $r_k$ is the actual received symbol and $\hat{r}_k$ is a reconstructed received symbol given by $$\hat{r}_k = H_M \hat{s}_{k-M} + \ldots + H_0 \hat{s}_k \quad (3)$$

The channel estimates can be computed from pilot symbols. The sequence metric $E_K$ is the sum of incremental symbol metrics, given by $$E_K \sum_{j=1}^{K} e_j \quad (4)$$

The sequence metric $E_K$ is the correct metric in the maximum likelihood (ML) sense. That is, if all possible sequences are searched, the one with the smallest $E_K$ is the ML solution.

A maximum likelihood sequence estimation (MLSE) equalizer uses the sequence metric $E_K$ and searches over all $q^K$ possible sequences. However, the optimal equalizer in the ML sense is also the most complex. For a channel with memory M, the MLSE equalizer operates on a trellis with K stages, where each stage has $q^M$ states, and the transition to the next stage has $q^{M+1}$ branches. At stage k-1, a state represents M symbols $(\hat{s}_{k-M}, \ldots, \hat{s}_{k-1})$. For notational simplicity, we label the states at each stage 0 to $q^M - 1$. At the transition from stage k-1 to stage k, a branch represents a symbol $\hat{s}_k$, and is labeled by its starting and ending state pair (j',j). For each state j, the fan-in I(j) is the set of incoming branches.

The branch metric of a branch (j',j) is denoted $e_k(j',j)$, and given by Eq. (2). The trellis starts at stage 0 in state 0. At each stage, the equalizer determines a surviving path for each state and computes a sequence metric for the surviving path. The surviving path is the path leading into a state with the lowest sequence metric. The sequence metric for the surviving path becomes the state metric for the state. At stage k, the state metric $E_k(j)$ of state j is given by $$E_k(j) = \min_{j' \in I(j)} (E_{k-1}(j') + e_k(j', j)) \quad (5)$$

In addition, the state in I(j) that achieves the minimum is the called the predecessor of state j, and denoted $\pi_{k-1}(j)$. Note that by tracing back from state j to state 0, we identify the partial sequence $(\hat{s}_1, \ldots, \hat{s}_k)$ whose sequence metric according to Eq. 4 coincides with $E_k(j)$. When the last stage K is reached, the best sequence overall can be found by tracing back through the trellis from the state with the best state metric. Roughly speaking, the storage complexity of the MLSE is driven by the number of states, and the computational complexity by the number of branches. As either M or q grows large, the complexity explodes.

There are a number of reduced complexity equalizers that attempt to approximate the ML solution. One such reduced complexity equalizer is the decision feedback sequence estimation (DFSE) equalizer. The DFSE equalizer uses the ML metric, but reduces the search space. The DFSE memory M'<M is a design parameter. The DFSE trellis is the same as a MLSE trellis, but with $q^{M'}$ states.

At stage k-1, a state now represents the newer M' symbols $(\hat{s}_{k-M'}, \ldots, \hat{s}_{k-1})$. The missing older (M-M') symbols needed to compute the incremental metrics are found by tentative decisions. That is, they are identified by tracing back (M-M') stages from that state. The reduction of the state space means that the DFSE equalizer search is restricted. Conceptually, by making tentative decisions at intermediate stages, the DFSE is only considering the most promising partial sequences for further extension in subsequent stages.

Another reduced complexity equalizer is referred to herein as the truncated MLSE equalizer. The truncated MLSE equalizer reduces complexity by truncating the channel response and ignoring channel taps beyond a certain value M'<M in the computation of the branch metrics. The truncated MLSE trellis is the same as a MLSE trellis, but with $q^{M'}$ states at each stage. At stage k-1, a state represents M' symbols $(\hat{s}_{k-M'}, \ldots, \hat{s}_{k-1})$. The incremental metric is restricted to M' symbols and channel taps. Consequently the sequence metric is different from the ML metric.

Another type of equalizer is the Stack algorithm (SA) equalizer. The SA is an aggressive depth first tree search algorithm with a simple structure. It is well suited for scenarios where the state space is very large, making breadth first techniques impractical. One notable feature of the Stack algorithm is the comparison of symbol sequences of different lengths, for the purpose of ranking them as more or less likely eventual solutions. This is made possible by the Fano metric.

The Stack algorithm operates on a tree of depth K. The root node of the tree, denoted Θ, is at index 0. A node N at index k−1 is associated with its partial sequence $(\hat{s}_1, \ldots, \hat{s}_{k-1})$ starting from the root node. The fan-out of node N is the set of q branches that start in N. Each branch represents a symbol $\hat{s}_k$. The extension of node N by a branch B results in a new node N' at index k, associated with the partial sequence $(\hat{s}_1, \ldots, \hat{s}_k)$.

The branch B is allocated an incremental metric, given by $$f_k(B) = \|r_k - \tilde{r}_k\|^2 - \beta_k \quad (6)$$

This is known as the Fano metric. The bias term $\beta_k$ is needed to enable the comparison of partial sequences of different lengths. There are many methods for choosing this bias. For instance, a simple bias is given by the noise power. The end node N' is allocated a node metric, given by $$F_k(N') = F_{k-1}(N) + f_k(B) \quad (7)$$

Note that the true sequence metric of $(\hat{s}_1, \ldots, \hat{s}_k)$, given by Eq. 4 does not coincide with $F_k(N')$, due to the bias in the Fano metric.

In the full tree of depth K, each node is extended, and every possible sequence of length K is represented. However, the SA does not search the full tree, but instead tries to focus on the nodes corresponding to the most likely sequences. In this sense, the SA defines a sparse sub-tree of the full tree.

The SA equalizer includes an ordered list of nodes, with the best candidate on top. The best node is removed from the stack. It is extended via the branches in its fan-out. The resulting new nodes are slotted in the stack according to their Fano-based sequence metric. The SA is initialized with Θ. The SA stops when the node at the top of the stack has index k=K. The sequence of length K corresponding to that node is the output.

Returning to FIG. 2, the primary detector 124 may comprise a truncated MLSE equalizer, DFSE equalizer, SA equalizer, or other reduced complexity equalizer. The primary detector 124 generates an initial sequence estimate based on the received signal r. The secondary detector 126, as noted previously, searches in the vicinity of the initial estimate to determine if there is a better solution.

Figure 6:
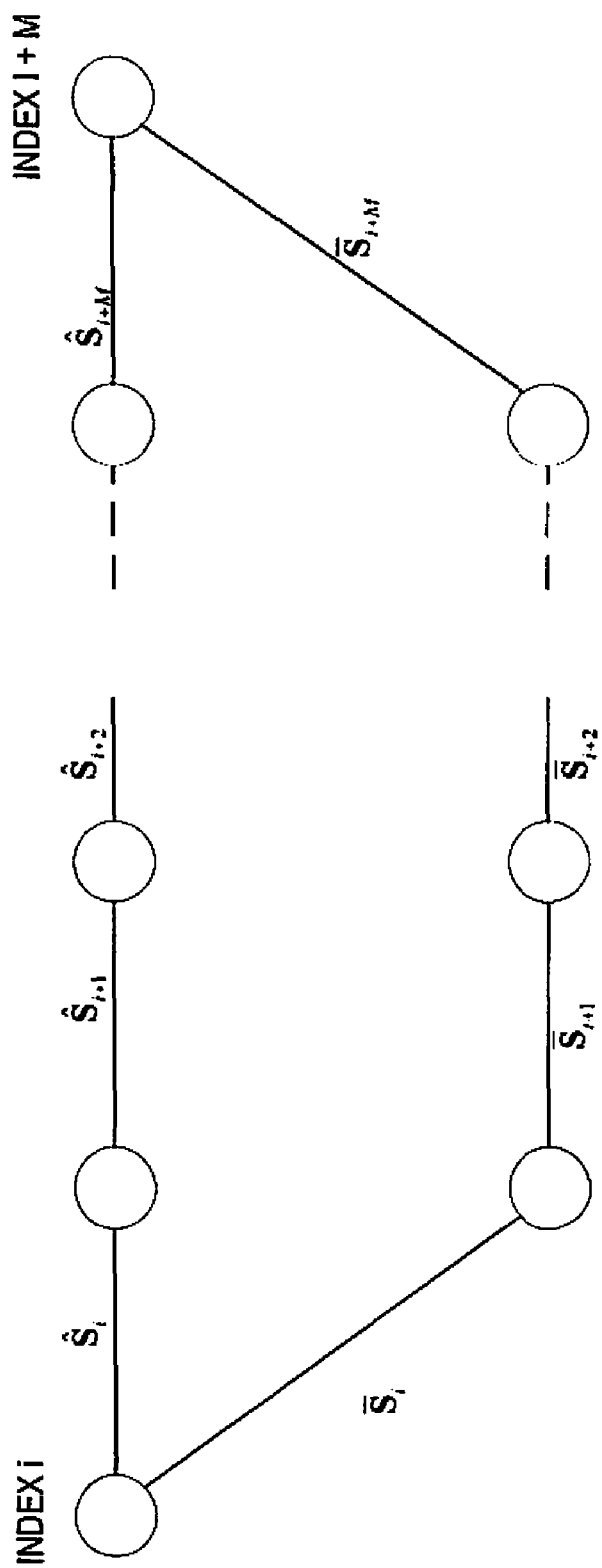
FIG. 6 illustrates an exemplary method for equalizing a received signal.

Because a suboptimal search algorithm is used in the primary detector 124, detection errors may occur. FIG. 6 illustrates such an error event. Suppose that symbol $\hat{s}_i$ of $\hat{S}$ is incorrect. Let $\bar{s}_i$ denote an alternative symbol. For a channel with memory M, the shortest error event that includes $\bar{s}_1$ is of length (M+1), starts at index (i−1) and ends at index (i+M). For that error event, all other symbols in $\hat{S}$ except $\hat{s}_i$ are unchanged. The shortest error events are the most probable under the assumption of white Gaussian noise. Therefore, it is advantageous to focus on the most probable error events. Later we consider longer events. The length K sequence with only $\hat{s}_i$ changed to $\bar{s}_i$ is denoted $\bar{S}$.

Changing $\hat{s}_i$ to $\bar{s}_1$ affects the (M+1) reconstructed received values at indices i to (i+M). The new values are denoted $(\bar{r}_i, \ldots, \bar{r}_{i+M})$, and can be found from Eq. 3. The incremental metrics are affected accordingly. They are denoted $(\bar{e}_i, \ldots, \bar{e}_{i+M})$, and can be found from Eq. 2. Since the incremental metrics of the two sequences are otherwise unchanged, the sequence metric $\bar{E}_K$ of $\bar{S}$ can be written as $$\bar{E}_K = \hat{E}_K - \sum_{k=i}^{i+M} \hat{e}_k + \sum_{k=i}^{i+M} \bar{e}_k \quad (8)$$

This equation highlights the change in the sequence metric. It is also an efficient way of computing $\hat{E}_K$ if K is large compared to M. If $\bar{E}_K < \hat{E}_K$, then $\bar{S}$ is a better sequence estimate in the ML sense than $\hat{S}$, and should be adopted.

The primary purpose of the secondary detector 126 is to perform a search in the vicinity of the initial sequence estimate $\hat{S}$ generated by primary detector 124 to determine if a better sequence estimate exists. Of course, the search is not exhaustive and dos not guarantee that the best solution will be found.

Figure 2:
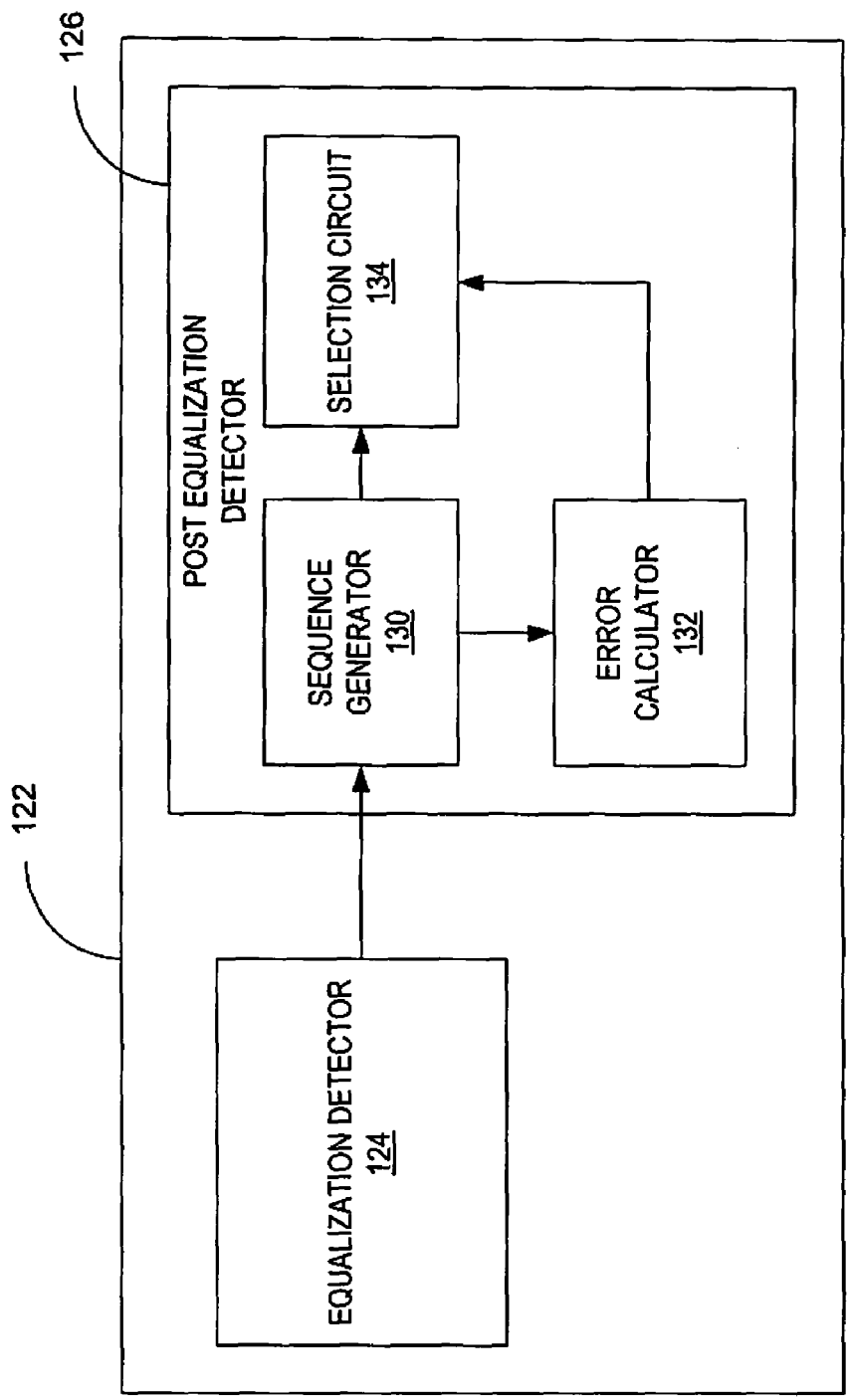
FIG. 2 illustrates an exemplary receiver including a primary detector and secondary detector.

FIG. 2 illustrates one exemplary embodiment of the secondary detector 126. The secondary detector 126 comprises a sequence generator 130, error calculator 132, and selection circuit 134. The sequence generator 130 receives the initial sequence estimate from the primary detector 124 and generates one or more revised sequence estimates for testing. The error calculator 132 generates error metrics for the initial sequence estimate output by the primary detector 124 and the revised sequence estimates from the sequence generator 130. In some embodiments where the primary detector 124 uses a true ML metric, the sequence metric for the initial sequence estimate may already be known. The selection circuit 134 selects one of the initial and revised sequence estimates as the final sequence estimate based on the computed error metrics and outputs the final sequence estimate for decoding.

Figure 3:
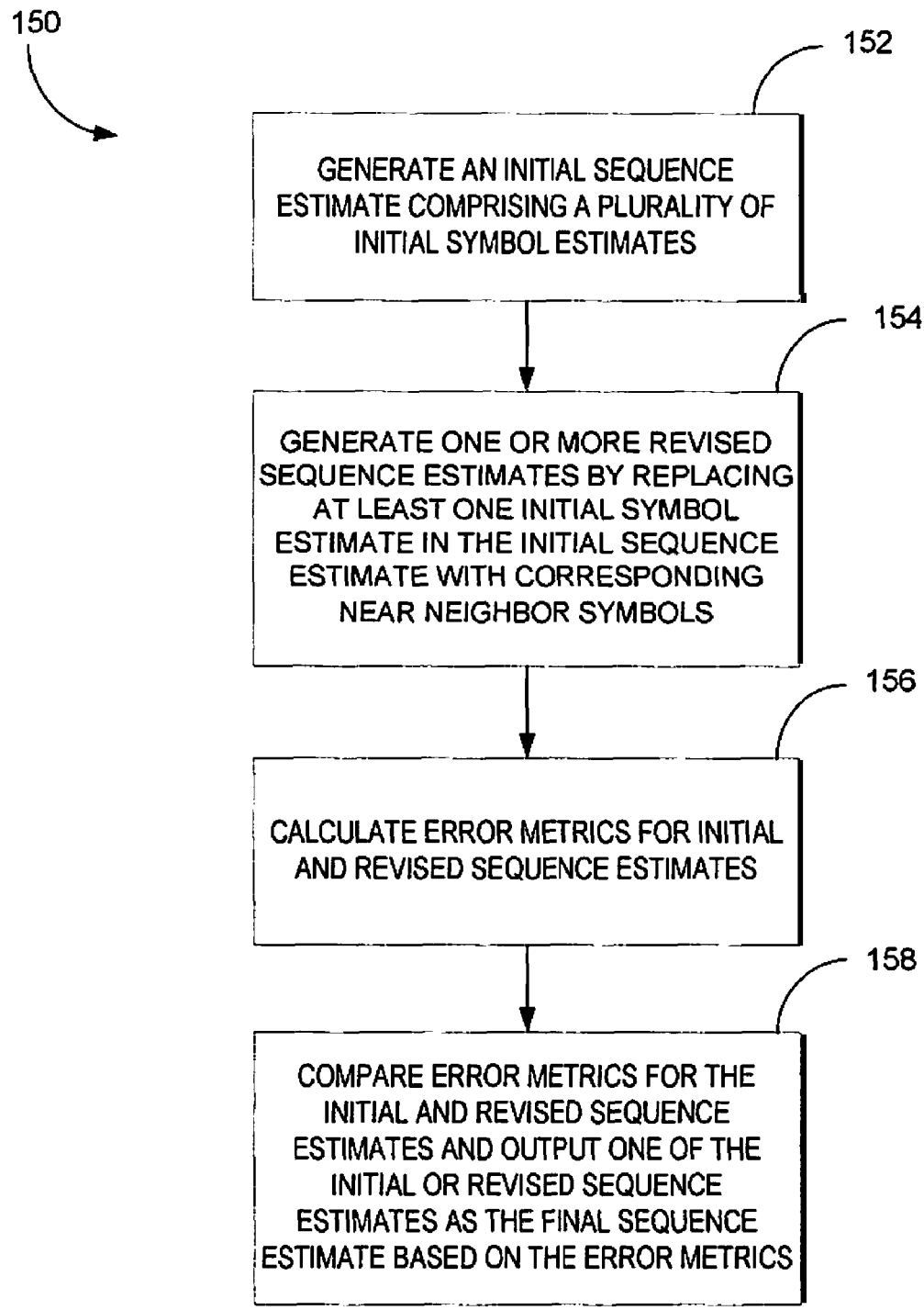
FIG. 3 illustrates an exemplary 4 ASK signaling constellation with Gray mapping.

FIG. 3 illustrates an exemplary method 150 implemented by the detection circuit 122 according to one embodiment of the invention. The method begins when a signal is received. The primary detector 124 process K symbols of the received sequence to generate an initial sequence estimate comprising a plurality of initial symbol estimates (block 152). The initial sequence estimate may contain one or more errors. The secondary detector 124 generates one or more revised sequence estimates by replacing at least one initial symbol estimate in the initial sequence estimate with corresponding nearest neighbor symbols (block 154). The error calculator 132 computes an error metric (e.g., an ML metric) for the initial and revised sequence estimates (block 156). In some embodiments, the ML metric for the initial sequence estimate may be computed by the primary detector 124. The selection circuit 136 compares the ML metrics for the initial and revised sequence estimates and selects one as the final sequence estimate (block 158). More particularly, the selection circuit 136 outputs the revised sequence estimate with the lowest ML metric as the final sequence estimate.

The secondary detector 124 generates the revised sequence estimates by substituting nearest neighbor symbols for initial symbol estimates in the initial sequence estimate. A nearest neighbor symbol is one of N symbols in the signaling constellation with the smallest Euclidean distances from a symbol in the initial sequence estimate. The secondary detector 124 defines a set of nearest neighbor symbols for each initial symbol estimate and substitutes each nearest neighbor symbol into the initial sequence estimate to generate one revised sequence estimate. In some embodiments, the set of nearest neighbor symbols will include only the true nearest neighbor. In other embodiments, the set of nearest neighbor symbols may include the two or more nearest neighbor symbols. Generally, it is preferred that the nearest neighbor symbols be determined in the "receive domain" to account for the effects of the channel. That is, the selection of the nearest neighbor should consider the effect of the channel, and consider the nearest neighbors of the reconstructed received sequence $\hat{R}(\hat{r}_1, \ldots, \hat{r}_K)$, where each value $\hat{r}_1$ is found from the appropriate symbols of $\hat{S}$ using Eq. 2. Finding the nearest neighbor in the receive domain is a highly complex operation. Also, since the channel changes with time, the operation needs to be repeated each time the channel conditions change.

One aspect of the present invention is to provide a more manageable nearest neighbor procedure. In one exemplary embodiment, the nearest neighbor symbols in the "transmit domain" rather than the "receive domain" are used. That is, the effect of the channel is ignored, and the only nearest neighbor symbols of $\hat{S}$ in the signaling constellation are considered. Furthermore, the nearest neighbor symbols can, in some embodiments, be determined for individual symbols in $\hat{S}$, which will greatly simplify the search for nearest neighbor symbols. The nearest neighbor set of a symbol value $\hat{s}$ is denoted $T(s)$.

By ignoring the effect of channel in determining the nearest neighbor set, some valuable information is lost. A nearest neighbor symbol in the transmit domain is not necessarily a nearest neighbor symbol in the receive domain. Nevertheless, it is a good guess in an average sense. Also, while the nearest neighbor symbols are determined in the transmit domain, the effect of the channel on the nearest neighbor symbols is taken into account in the form of short length error events, as it will become clear below.

Figure 4:
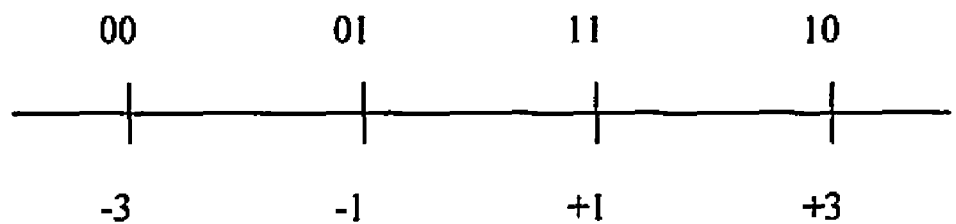
FIG. 4 illustrates an exemplary 8 ASK signaling constellation with Gray mapping.
Figure 5:
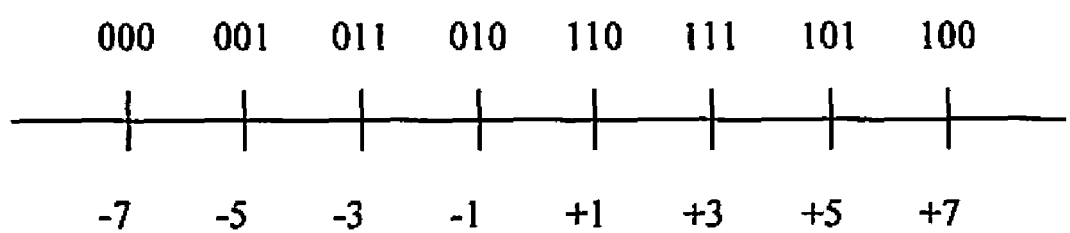
FIG. 5 illustrates an error event in a sequence estimate output by a primary detector.

FIG. 4 illustrates a 4-ASK signaling constellation and will be used to describe how the set of nearest neighbor symbols is determined. The signal constellation includes 4 symbols and Gray mapping is used. The 2 inner symbols each have 2 nearest neighbors, and the 2 outer symbols each have 1 nearest neighbor. Similarly, FIG. 5 illustrates an 8-ASK constellation with a 3-bit Gray map. The 6 inner symbols each have 2 nearest neighbors, and the 2 outer symbols each have 1 nearest neighbor.

A popular map for QAM is defined per ASK component. That is, for 16-QAM, the 4-bit map is defined as two 2-bit Gray maps on the 4-ASK components. One can check that the 4 inner symbols each have 4 nearest neighbors. The 4 corner symbols each have 2 nearest neighbors. The remaining 8 outer symbols each have 3 nearest neighbors. Similarly, for 64-QAM, the 6-bit map is defined as two 3-bit Gray maps on the 8-ASK components. The 36 inner symbols each have 4 nearest neighbors. The 4 corner symbols each have 2 nearest neighbors. The remaining 24 outer symbols each have 3 nearest neighbors.

In one exemplary embodiment, the sequence generator 130 changes one symbol at a time in the initial sequence estimate to generate the revised sequence estimates and the error calculator 132 computes an error metric for each revised sequence estimate as well as the initial sequence estimate $\hat{S}$. That is, the sequence generator 130 starts with the first symbol $\hat{s}_1$ in $\hat{S}$ and replaces it with one of the nearest neighbor symbols $\bar{s}_1$ in the set of nearest neighbor symbols $T(\bar{s}_1)$ to get a revised sequence estimate $\bar{S}$. Those skilled in the art will appreciate that the nearest neighbor set $T(\bar{s}_1)$ may include more than one nearest neighbor symbol. Therefore, there may be more than one revised sequence estimate corresponding to each symbol $\hat{s}_1$ in the initial sequence estimate $\hat{S}$. The error calculator 132 computes a ML metric for the revised sequence estimate $\bar{S}$. After cycling through all K symbols, the selection circuit 134 determines whether the ML metric for one of the N revised sequence estimates $\bar{S}$ is lower than the ML metric for the initial sequence estimate $\hat{S}$. If a revised sequence estimate has a lower ML metric, the revised sequence estimate $\bar{S}$ is selected as the new tentative sequence estimate and the process is repeated beginning with the first symbol in the new tentative sequence estimate $\bar{S}$. The search stops if the best sequence estimate does not change after a full cycle. Further, the search may be limited to a predetermined number of cycles, after which the best tentative sequence estimate is output as final sequence estimate. When the search ends, the initial sequence estimate $\hat{S}$ or the revised sequence estimate $\bar{S}$, whichever has the lowest ML metric, is selected as the final sequence estimate.

In some embodiments of the invention, the sequence generator 130 may change two or more one symbols in the initial sequence estimate $\hat{S}$ at a time to generate the revised sequence estimates $\bar{S}$. First consider the case where two symbols are changed simultaneously in $\hat{S}$. The changed symbols are denoted $\tilde{s}_i$ and $\tilde{s}_{i+N}$. If N>M, then the two symbols belong to separate error events. So this case was already covered in the single symbol search. If N≤M, they belong to the same error event of length (+M+1), starting at index i and ending at index (i+N+M).

The sequence generator 130 may change up to L adjacent symbols at a time. The number L is a design parameter. Thus, the nearest neighbor set $U(\bar{s}_i)$ for the case where two or more symbols are changed at a time is given by $$U(\bar{s}_i) = T(\bar{s}_i) U\{\bar{s}_i\} \qquad (9)$$

Including $\bar{s}_i$ in $U(\bar{s}_i)$ means that cases are considered where fewer than L symbols are actually changed. Also, the longest error event is of length (L+M) and corresponds to the case where at least the first and last among the L adjacent symbols have actually changed.

The search procedure for the case where multiple symbols are changed at a given time is essentially the same as previously described. The sequence generator 130 starts with the first L symbols in the initial sequence estimate $\hat{S}$, using $U(\bar{s}_1), \ldots, U(\bar{s}_L)$ to generate the revised sequence estimates $\bar{S}$. That is, a candidate sequence $\bar{S}$ is equal to $\hat{S}$ except for $(\hat{s}_1, \ldots, \hat{s}_L)$ being replaced by symbols from $U(\bar{s}_1), \ldots, U(\bar{s}_L)$. The sequence generator 130 then moves to the next L symbols, and so on, until the end of the input sequence is reached. The last search may be over fewer than L symbols if K is not a multiple of L. The error calculator computes the ML metric $\bar{E}_K$ for each revised sequence estimate $\bar{S}$. If $\bar{E}_K < \hat{E}_K$ for one of the revised sequence estimates, the revised sequence estimate with the lowest ML metric is selected and the process is repeated using the revised sequence estimate as the new tentative sequence estimate.

The search procedure may be generalized further by overlapping the successive groups of L symbols. For instance, assuming L is an even number, after the first L symbols are considered, the next L symbols to be considered consist of the second half of the first L symbols and the next L/2 symbols, and so on. The benefit of overlap is that more potential candidates are included in the search. There is a corresponding increase in complexity.

As mentioned earlier, bit soft values can be exploited by a subsequent decoder to boost overall performance. The generation of bit soft values can be an awkward add-on to the primary detector 124, but is a natural extension of the secondary detector 126. Consider a constellation with $2^J$ symbols. Let $b^{[1]} \ldots b^{[J]}$ denote the J bits mapping into a symbol s in the final sequence estimate. In order to describe the bit soft values, it is convenient to define the bit nearest neighbor (BNN) set for each bit in symbol s. For bit $b^{[j]}$ in symbol s, the BNN is the closest symbol in the constellation with $b^{[j]}$ flipped. If two symbols satisfy the BNN requirement, one is picked so the BNN is unique. No condition is imposed on the remaining J−1 bits, which may or may not change. Note that the BNNs can be computed off-line, from the constellation and the bit map.

As one example, consider 4-ASK with a Gray map, shown in 4. For s=−3 with $b^{[1]}b^{[2]}$=00, $s'^{[1]}$=+1 and $s'^{[2]}$=−1. For s=−1 with $b^{[1]}b^{[2]}$=01, $s'^{[1]}$ and $s'^{[2]}$=−3, etc.

As another example consider 8-ASK with a Gray map, shown in 5. For s=−7 with $b^{[1]}b^{[2]}b^{[3]}$=000, $s'^{[1]}$=+1, $s'^{[2]}$=−3, and $s'^{[3]}$=−5. For s=−1 with $b^{[1]}b^{[2]}b^{[3]}$=010, $s'^{[1]}$=+1, $s'^{[2]}$=−5, and $s'^{[3]}$=−3, etc.

The procedure used to compute bit soft values is similar to the procedure for computing sequence metrics for the revised sequence estimates. To compute a bit soft value for bit j in symbol $\bar{s}_i$ in the solution $\bar{S}$ from the secondary detector 126, the soft value calculator replaces symbol $\bar{s}_i$ with the BNN for bit j to construct a sequence $\tilde{S}$ equal to $\bar{S}$ except for $\bar{s}_i$ being replaced by the appropriate BNN. The soft value calculator compute the sequence metric $\tilde{E}_K$ for $\tilde{S}$. The soft value λ for bit j in symbol i is given by $$\lambda = |\tilde{E}_K - \bar{E}_K| \quad (10)$$

It can be seen from the ASK example above that $\tilde{S}$ may already be in the nearest neighbor set, so $\tilde{E}_K$ would have already been computed in the secondary detector 126, in which case there is no need to re-compute it for the soft value generation.

Thus far the nearest neighbor set was defined strictly, to include only the true nearest neighbors. It is possible to relax the definition of nearest neighbor set, to include the next nearest neighbors, for instance. In a large constellation, the relaxed nearest neighbor set would still be small in comparison to the constellation. The nearest neighbor set can be relaxed further to include a third level of nearest neighbors, etc. In general, relaxing the nearest neighbor sets enables a wider search in the secondary detector 126, increasing the chance to identify the true ML solution. Of course, this is done at the price of higher complexity.

Although the primary detector 124 is not naturally well suited for generating soft values, reliability information produced by the primary detector can be exploited in the secondary detector 124. One simple source of reliability information is the sequence of incremental metrics. In general, a small incremental metric at index i indicates high reliability for the symbol at the same index, and a large incremental metric indicates the opposite. Another simple source of reliability information is difference between the best sequence metric ending in a given state at index i, and the second best sequence metric. A large difference indicates a high reliability for the symbol at index (i−M−1), and a small difference indicates the opposite.

The secondary detector 126 can exploit reliability information from the primary detector 124. One approach is to rank the symbols in the initial sequence estimate $\hat{S}$ from least to most reliable, and to check their nearest neighbor sets in that order. Thus, the neighborhoods of the least reliable symbols are searched first, since they are the most likely to be in error. Furthermore, a secondary detector 126 may only search the nearest neighbor sets of the least reliable symbols in $\hat{S}$, for instance only the worst x %.

The secondary detector 126 in the present invention is a suitable second stage to follow a primary detector 124 that either does not conduct an exhaustive search, or does not use the true ML metric, or both. The secondary detector 126 also provides a convenient for soft value generation.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A receiver for a mobile communication device, said detector circuit comprising:
   an primary detector for generating an initial sequence estimate comprising a plurality of initial symbol estimates from a received symbol sequence corrupted by intersymbol interference;
   a secondary detector to receive said initial sequence estimate and to output a final sequence estimate comprising a plurality of final symbol estimates, said secondary detector comprising:
      a sequence generator configured to generate one or more revised sequence estimates by replacing at least one initial symbol estimate in said initial sequence estimate with a corresponding nearest neighbor symbol in each of said revised symbol estimates;
      an error calculator to compute error metrics for said initial and revised sequence estimates;
      a selection circuit to compare error metrics for said initial and revised sequence estimates and to output one of said initial or revised sequence estimates as said final sequence estimate based on said error metrics.

2. The receiver of claim 1 wherein said sequence generator is configured to replace two or more initial symbol estimates with corresponding nearest neighbor symbols to generate each of said revised sequence estimates.

3. The receiver of claim 2 wherein said sequence generator is configured to replace two or more adjacent initial symbol estimates with corresponding nearest neighbor symbols to generate each of said revised sequence estimates.

4. The receiver of claim 3 wherein the sequence generator is configured to:
   generate a first set of revised sequence estimates by replacing a first set of L initial symbol estimates with L nearest neighbor symbols;
   generate a second set of revised sequence estimates by replacing a second set of L initial symbol estimates with L nearest neighbor symbols;
   wherein the first and second sets of initial symbol estimates overlap.

5. The receiver of claim 1 wherein the sequence generator is configured to substitute two or more nearest neighbor symbols selected from a nearest neighbor set for the initial symbol estimate to generate two or more revised sequence estimates that differ at the same symbol position.

6. The receiver of claim 1 wherein the primary detector provides reliability metrics for the initial symbol estimate to the secondary detector, and wherein the sequence generator is configured to use the reliability metrics to select initial symbol estimates in the initial sequence estimate to be replaced by nearest neighbor symbols.

7. The receiver of claim 1 wherein the primary detector provides reliability metrics for the initial symbol estimate to the secondary detector, and wherein the sequence generator is configured to use the reliability metrics to determine a replacement order for processing the initial symbol estimates in the initial sequence estimate.

8. The receiver of claim 1 wherein the secondary detector further comprises a soft value generator configured to generate bit soft values for bits in one or more final symbol estimates.

9. The receiver of claim 1 wherein soft value generator is configured to compute bit soft values for a given bit in a final symbol estimate by:

replacing the final symbol estimate in the final sequence estimate containing the given bit with a bit nearest neighbor symbol to generate a modified sequence;

computing an error metric for the modified sequence;

computing the bit soft value for the given bit based on a difference between the error metric for the final sequence estimate and the error metric for the modified sequence.

10. A method in a receiver for a mobile communication device of equalizing a signal received over a communication channel, said method comprising:

generating an initial sequence estimate comprising a plurality of initial symbol estimates from a received symbol sequence corrupted by intersymbol interference;

generating one or more revised sequence estimates by replacing at least one initial symbol estimate in said initial sequence estimate with a corresponding nearest neighbor symbol in each of said revised symbol estimates;

computing error metrics for said initial and revised sequence estimates;

comparing error metrics for said initial and revised sequence estimates and outputting one of said initial or revised sequence estimates as said final sequence estimate based on said error metrics.

11. The method of claim 10 wherein generating one or more revised sequence estimates comprises replacing two or more initial symbol estimates with corresponding nearest neighbor symbols to generate each of said revised sequence estimates.

12. The method of claim 11 wherein generating one or more revised sequence estimates comprises replacing two or more adjacent initial symbol estimates with corresponding nearest neighbor symbols to generate each of said revised sequence estimates.

13. The method of claim 11 wherein generating one or more revised sequence estimates further comprises:

generating a first set of revised sequence estimates by replacing a first set of L initial symbol estimates with L nearest neighbor symbols;

generating a second set of revised sequence estimates by replacing a second set of L initial symbol estimates with L nearest neighbor symbols;

wherein the first and second sets of initial symbol estimates overlap.

14. The method of claim 10 wherein generating one or more revised sequence estimates comprises substituting two or more nearest neighbor symbols selected from a nearest neighbor set for the initial symbol estimate to generate two or more revised sequence estimates that differ at the same symbol position.

15. The method of claim 10 wherein generating one or more revised sequence estimates further comprises generating reliability metrics for the initial symbol estimate, and selecting initial symbol estimates in the initial sequence estimate to be replaced by nearest neighbor symbols based on said reliability metrics.

16. The method of claim 10 wherein generating one or more revised sequence estimates further comprises generating reliability metrics for the initial symbol estimate, determining a replacement order for processing the initial symbol estimates in the initial sequence estimate based on the reliability metrics.

17. The method of claim 10 further comprising generating bit soft values for bits in one or more final symbol estimates.

18. The method of claim 10 wherein generating bit soft values for bits in one or more final symbol estimate comprises:

replacing the final symbol estimate in the final sequence estimate containing the given bit with a bit nearest neighbor symbol to generate a modified sequence;

computing an error metric for the modified sequence;

computing the bit soft value for the given bit based on a difference between the error metric for the final sequence estimate and the error metric for the modified sequence.

* * * * *

UNITED STATES PATENT AND TRADEMARK OFFICE
CERTIFICATE OF CORRECTION

PATENT NO. : 8,407,573 B2
APPLICATION NO. : 12/576343
DATED : March 26, 2013
INVENTOR(S) : Khayrallah It is certified that error appears in the above-identified patent and that said Letters Patent is hereby corrected as shown below:

IN THE SPECIFICATION

1. In Column 2, Line 16, delete "WIMAX." and insert -- WiMAX. --, therefor.

2. In Column 2, Line 43, delete "130." and insert -- 120. --, therefor.

3. In Column 3, Line 4, delete "124" and insert -- 126 --, therefor.

4. In Column 3, Line 6, delete "124" and insert -- 126 --, therefor.

5. In Column 3, Line 35, delete "$\hat{S}_1$" and insert -- $\hat{S}_i$ --, therefor.

6. In Column 3, Line 37, delete "$\hat{S}_1$," and insert -- $\hat{S}_i$, --, therefor.

7. In Column 3, Line 55, in Equation (4), delete "$E_K$" and insert -- $E_K=$ --, therefor.

8. In Column 4, Line 18, in Equation (5), delete "$\min_{j' \in I(j)}$" and insert -- $\min_{j' \in I(j)}$ --, therefor.

9. In Column 5, Line 43, delete "$\overline{S}_1$" and insert -- $\overline{S}_i$ --, therefor.

10. In Column 5, Line 51, delete "$\overline{S}_1$" and insert -- $\overline{S}_i$ --, therefor.

11. In Column 6, Line 5, delete "dos" and insert -- does --, therefor.

12. In Column 6, Line 29, delete "124" and insert -- 126 --, therefor.

13. In Column 6, Line 42, delete "124" and insert -- 126 --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,407,573 B2

14. In Column 6, Line 48, delete "124" and insert -- 126 --, therefor.

15. In Column 6, Line 60, delete "$\hat{R}$" and insert -- $\hat{R} =$ --, therefor.

16. In Column 8, Line 9, delete "(+M+1)," and insert -- (N+M+1), --, therefor.

17. In Column 8, Line 26, delete "$U(\overline{s}_1)$" and insert -- $U(\overline{s}_i)$ --, therefor.

18. In Column 8, Line 26, delete "$\hat{s}_1)$" and insert -- $\hat{s}_i)$ --, therefor.

19. In Column 8, Line 26, delete "$U(\overline{s}_1).$" and insert -- $U(\overline{s}_i).$ --, therefor.

20. In Column 8, Line 62, delete "4." and insert -- FIG. 4. --, therefor.

21. In Column 8, Line 65, delete "5." and insert -- FIG. 5. --, therefor.

22. In Column 9, Line 6, delete "$\overline{S}$ equal" and insert -- $\tilde{S}$ equal --, therefor.

23. In Column 9, Line 33, delete "124." and insert -- 126. --, therefor.